(12) United States Patent
Li (10) Patent No.: US 10,033,205 B2
(45) Date of Patent: Jul. 24, 2018

(54) POWER SUPPLY APPARATUS AND METHOD OF PROVIDING POWER TO AN ELECTRONIC DEVICE TO PREVENT OVERCURRENT DISCHARGE

(71) Applicant: Lenovo (Beijing) Limited, Beijing (CN)

(72) Inventor: Xianxi Li, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 127 days.

(21) Appl. No.: 15/085,091

(22) Filed: Mar. 30, 2016

(65) Prior Publication Data

US 2017/0179740 A1    Jun. 22, 2017

(30) Foreign Application Priority Data

Dec. 18, 2015   (CN) .......................... 2015 1 0959133

(51) Int. Cl.
   *H02J 7/00*   (2006.01)
(52) U.S. Cl.
   CPC .......... *H02J 7/0029* (2013.01); *H02J 7/0078* (2013.01); *H02J 7/0081* (2013.01); *H02J 2007/004* (2013.01)
(58) Field of Classification Search
   CPC .. H02J 7/0031; H02J 7/0021; H02J 2007/004; H02J 7/0026; H02J 2007/0037; H02J 7/007; H02J 7/0091; H02J 2007/0098; H02J 2007/0039; H02J 2007/0049; H01M 2010/4271; H01M 10/443; H01M 10/486

USPC ................ 320/121, 132, 134–136, 141–145, 320/150–154
See application file for complete search history.

(56) References Cited

U.S. PATENT DOCUMENTS

| 2001/0021092 | A1* | 9/2001 | Astala | H02J 7/0029 361/90 |
|---|---|---|---|---|
| 2002/0089318 | A1* | 7/2002 | Armstrong, II | G05F 1/56 323/285 |
| 2011/0169457 | A1* | 7/2011 | Mitani | H01M 10/443 320/134 |
| 2013/0009483 | A1* | 1/2013 | Kawate | H02J 3/383 307/77 |

FOREIGN PATENT DOCUMENTS

| CN | 101710694 A | 5/2010 |
|---|---|---|
| CN | 104052094 A | 9/2014 |
| JP | 2013-255339 A | 12/2013 |

* cited by examiner

*Primary Examiner* — Nghia Doan
(74) *Attorney, Agent, or Firm* — Kunzler, PC (57) ABSTRACT

For preventing overcurrent discharge, a protection method, a power supply apparatus, and an electronic device are disclosed. The power supply apparatus may include a power supply module and a protection circuit coupled to the power supply module and an electrical terminal. The protection circuit may include a controller that directs power from the power supply module to the electrical terminal, wherein the controller stops a current flow from the power supply module to the electrical terminal in response to a voltage detected by the controller being higher than a threshold voltage based on a temperature of the protection circuit.

19 Claims, 5 Drawing Sheets

POWER SUPPLY APPARATUS AND METHOD OF PROVIDING POWER TO AN ELECTRONIC DEVICE TO PREVENT OVERCURRENT DISCHARGE

CROSS-REFERENCE TO RELATED APPLICATIONS

This patent application claims priority to People's Republic of China Patent Application No. 201510959133.6 filed on Dec. 18, 2015 for XIANXI LI, the entire contents of which are incorporated herein by reference for all purposes.

FIELD

The subject matter disclosed herein relates to the field of electronic technology, in particular to a protection method, a power supply apparatus, and an electronic device to prevent overcurrent discharge.

BACKGROUND

With the continuous advances in science and technology, more and more electronic devices, such as smart phones, tablet PCs, notebook computers and all-in-one computers, etc., have entered into and brought great convenience to people's lives. To meet various needs of customers, electronic devices are required to possess more features, which, consequently, results in growing power consumption for electronic devices. Electronic devices have growing demands for battery's discharge capacity; and, to protect each functional module of electronic devices, the control accuracy for battery's discharge overcurrent protection becomes increasingly important. However, the technical issue of low control accuracy of discharge overcurrent protection of a battery in the prior art cannot meet the safety requirements of powered devices.

BRIEF SUMMARY

An apparatus for preventing overcurrent discharge is disclosed. A method and electronic device also perform the functions of the apparatus.

The apparatus may include a power supply module and a protection circuit coupled to the power supply module and an electrical terminal. The protection circuit may include a controller that directs power from the power supply module to the electrical terminal, wherein the controller stops a current flow from the power supply module to the electrical terminal in response to a voltage detected by the controller being higher than a threshold voltage based on a temperature of the protection circuit.

In some embodiments, the protection circuit further includes an electronic switch coupled to the controller. The controller operatively controls the electronic switch to stop the current flow in response the detected voltage being higher than the threshold voltage. In certain embodiments, the electronic switch may be a MOS transistor switch. In further embodiments, the MOS transistor switch may be encapsulated inside the controller.

In some embodiments, the controller provides a driving voltage that maintains the electronic switch in an on state in response to the voltage detected by the controller not being higher than the voltage threshold. In certain embodiments, the controller stores a correspondence table, the correspondence table correlating temperature values of the electronic switch, driving voltage values of the electronic switch, and impedance values of the electric switch. In one embodiment, the correspondence table contains an on-resistance impedance value of the protection circuit when driven with a $j^{th}$ driving voltage at an $i^{th}$ temperature for values of i from 1 to N and for values of j from 1 to M, wherein N is an integer greater than 0, and M is an integer greater than 0.

In certain embodiments, the controller comprises an output module that outputs a prompt to indicate that the power supply apparatus is in a discharge overcurrent in response to the detected voltage exceeding the threshold voltage. In some embodiments, the output module sends the prompt to a user terminal device.

The power supply apparatus may further include a backup power supply for powering the controller in response to stopping current flow from the power supply module. In certain embodiments, the power supply apparatus includes a temperature sensor that measures a temperature of the protection circuit, wherein the electrical terminal is connectable with an electronic device to provide power thereto.

A method of providing power to an electronic device to prevent overcurrent discharge may include: supplying power from a power supply apparatus to the electronic device; measuring a temperature of a protection circuit of the power supply apparatus; determining if a voltage detected by the protection circuit is higher than a threshold voltage, wherein the threshold voltage is based on the temperature of the protection circuit; and stopping a current flow from the power supply apparatus to the electronic device in response to the detected voltage exceeding the threshold voltage.

In some embodiments, the protection circuit comprises a control chip and a MOS transistor switch encapsulated inside the control chip, wherein stopping a current flow from the power supply apparatus comprises setting the MOS transistor switch to an off state. In certain embodiments, the method includes comprising maintaining the MOS transistor switch in an on state in response to the detected voltage not exceeding the voltage threshold.

In some embodiments, the method includes pre-storing a correspondence table of the temperature values of the protection circuit, driving voltage values of the protection circuit, and the impedance values of the protection circuit. The correspondence table may contain an on-resistance impedance value of the protection circuit when driven with a $j^{th}$ driving voltage at an $i^{th}$ temperature for values of i from 1 to N and for values of j from 1 to M, wherein N is an integer greater than 0, and M is an integer greater than 0.

In certain embodiments, the method includes outputting a prompt to indicate that the power supply apparatus is in a discharge overcurrent in response to the detected voltage exceeding the threshold voltage.

An electronic device for preventing overcurrent discharge may include a power supply module, a control chip connected to the power supply module, and an electronic switch controllable by the control chip. The control chip may monitor, in real time, a turn-on voltage value across the electronic switch and a temperature value of the electronic switch. The control chip may also monitor, in real time, a driving voltage value of the electronic switch at the temperature value. The control chip determines an impedance value of the electronic switch based on the temperature value and the driving voltage value, wherein the impedance value changes with temperature. The control chip also determines a voltage threshold based on the impedance value and a predetermined protection current, wherein the voltage threshold changes with the impedance value. The control chip controls a state of the electronic switch based on a comparison of the turn-on voltage value to the voltage threshold.

In some embodiments, the control chip includes a power supply input and a power supply output, the power supply input being connected with a positive electrode of the power supply module. In certain embodiments, one end of the electronic switch is connected with the power supply output of the control chip, wherein the control chip provides the electronic switch with the driving voltage over the power supply output, and wherein the other end of the electronic switch is connected in series with a negative electrode of the power supply module. In some embodiments, the electronic switch is a MOS transistor switch. In further embodiments, the MOS transistor switch is encapsulated inside the controller.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

The embodiments of the present disclosure provide a protection method, a power supply apparatus, a circuit protection device, and an electronic device accurately control discharge overcurrent protection of a battery or other power source.

For preventing discharge overcurrent, the disclosed embodiments provide a protection method, applied to the circuit protection device that provides a power supply with a discharge overcurrent protection. Generally, the protection method supplies power from a power supply apparatus to an electronic device, measures a temperature of a protection circuit of the power supply apparatus, determines whether a voltage detected by the protection circuit is higher than a threshold voltage (wherein the threshold voltage is based on the temperature of the protection circuit), and stops a current flow from the power supply apparatus to the electronic device in response to the detected voltage exceeding the threshold voltage.

In certain embodiments, the protection method may include monitoring, in real time, a turn-on voltage value across the electronic switch and a temperature value of the electronic switch. The protection method may include monitoring, in real-time, a driving voltage value of the electronic switch at a detected temperature value. The protection method may include determining an impedance value of the electronic switch based on the temperature value and on the driving voltage value. The protection method may include determining a voltage threshold based on the impedance value and on a predetermined protection current value. The protection method may further include controlling the state of the electronic switch based on a comparison of the turn-on voltage to the voltage threshold.

The embodiments described below, along with the accompanying drawings, described methods, systems, and apparatus for providing power to an electronic device while preventing overcurrent discharge. Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

Embodiment 1

Figure 1:
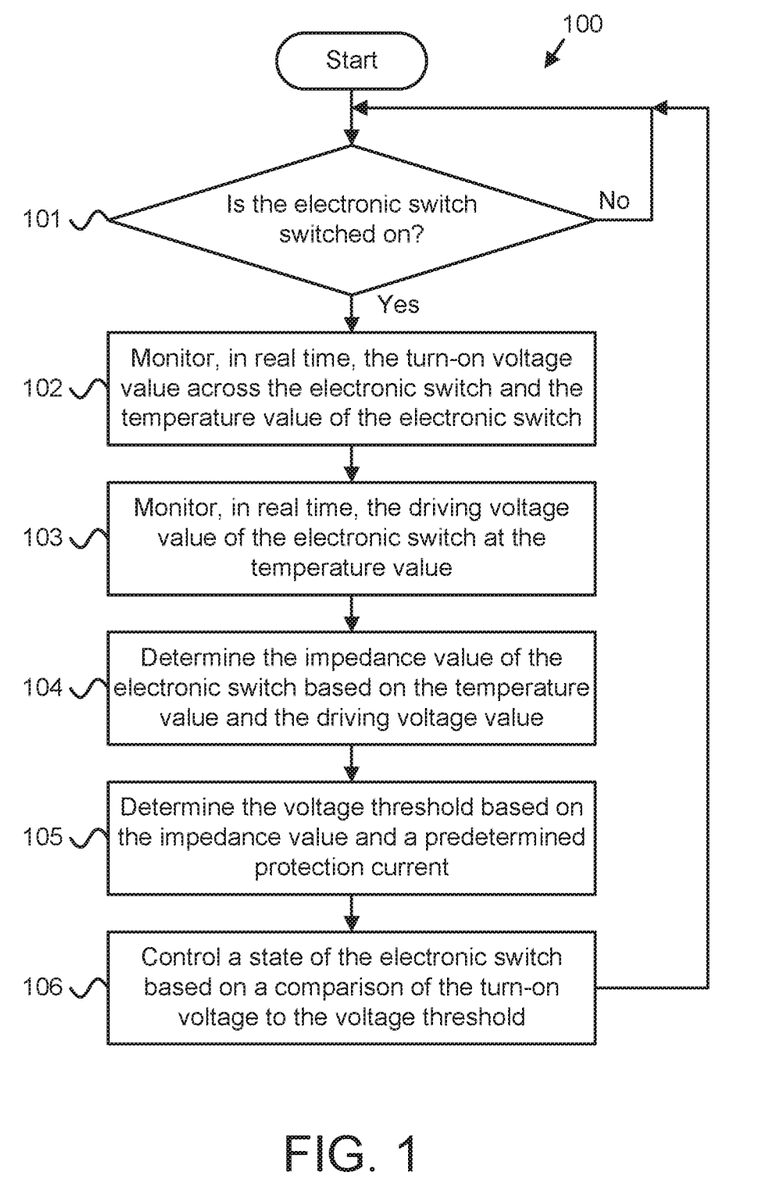
FIG. 1 is a flow diagram illustrating one embodiment of a protection method.

FIG. 1 depicts a flowchart diagram illustrating a protection method 100, according embodiments of the disclosure. The protection method 100 may be applied to a circuit protection device that provides a power supply with a discharge overcurrent protection. The protection method 100 may be performed in a reciprocating manner when an electronic switch is turned on. In one embodiment, the method 100 is performed by the power supply apparatus. In another embodiment, the method 100 may be performed by the electronic device. Alternatively, the method 100 may be performed by a processor and a computer readable storage medium. The computer readable storage medium may store code that is executed on the processor to perform the functions of the method 100.

The method 100 begins and determines 101 whether the electronic switch is turned on. In response to the electronic switch being turned on, the method 100 monitors 102, in real time, a turn-on voltage value across the electronic switch and a temperature value of the electronic switch. Otherwise, in response to the electronic switch not being turned on, the method 100 continues to wait for the electronic switch to be turned on.

The method 100 monitors 103, in real time, a driving voltage value of the electronic switch at the temperature value. The method 100 determines 104 an impedance value of the electronic switch based on the temperature value and the driving voltage value. In some embodiments, the impedance value changes with the temperature.

The method 100 determines 105 a voltage threshold based on the impedance value and a predetermined protection current. In some embodiments, the voltage threshold changes with the impedance value. The method 100 controls 106 a state (e.g., an on/off state) of the electronic switch based on a comparison of the turn-on voltage and the voltage threshold. In other embodiments, controlling 106 the state of the electronic switch includes determining whether to switch-off the electronic switch by comparing the turn-on voltage value with the voltage threshold. By switching off the electronic switch when the turn-on voltage reaches the voltage threshold, the method 100 provides the power supply with discharge overcurrent protection.

Specifically, the protection method 100 may be applied in a power supply apparatus having a power supply module, an electrical terminal for connecting with an electronic device for supplying power thereto, and a circuit protection device that provides power supply with a discharge overcurrent protection.

Figure 2:
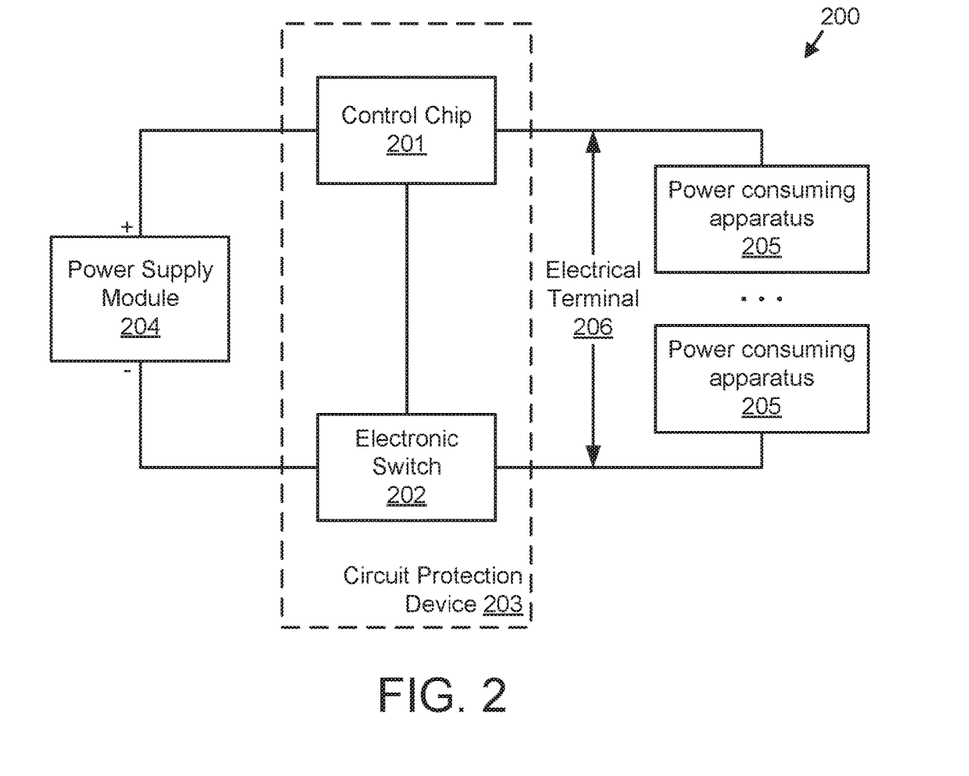
FIG. 2 is a structural diagram illustrating one embodiment of a power supply apparatus.

FIG. 2 depicts a schematic diagram of a power supply apparatus 200, according to embodiments of the invention. As depicted, the power supply apparatus 200 includes a controller (shown as a control chip 201) and an electronic switch 202, the controller and the electronic switch 202 forming a protection circuit. The control chip 201 is connected to a power supply module 204 and is used to provide the electronic switch 202 with a driving voltage that is required for its normal operation. As used herein, the driving voltage refers to a voltage provided by the control chip 201 to the electronic switch 202 for controlling the on/off states of the electronic switch 202. In some embodiments, the power supply module 204 is a battery of an electronic device.

The electronic switch 202 is connected in series with a negative electrode (or ground wire) of the power supply module 204. The power supply module 204, control chip 201, and electronic switch 202 form a closed loop with at least one power consuming apparatus 205. As depicted, more than one power consuming apparatus 205 may be connected to the power supply module 204 via an electrical terminal 206, with the controller and electronic switch located between the power consuming apparatus 205 and the power supply module 204.

When the power supply apparatus 200 is turned on, the control chip 201 detects the turn-on voltage U1 (V) and the temperature of the electronic switch 202 in real time. As used herein, the turn-on voltage refers to the voltage across the electronic switch 202 while in an ON state. For example, the control chip 201 may detect the temperature of the electronic switch 202 by receiving input from a temperature sensor connected to or embedded in the control chip 201. As another example, the control chip 201 may estimate the temperature of electronic switch 202 by measuring a temperature of the power supply module 204 (e.g., a battery) when the power supply module 204 is adjacent to (or included with) the electronic switch 202.

In some embodiments, the control chip 201 also monitors, in real time, the driving voltage that the control chip 201 provides for the electronic switch 202. The electronic switch 202 may have different on-resistance impedance values corresponding to different temperatures and different driving voltages. Thus, the electronic switch's 202 impedance value R (ohm) corresponding to the current temperature and current driving voltage may be obtained through a pre-stored correspondence of the temperatures, the driving voltages, and the impedances of the electronic switch 202. As used herein, the "on-resistance" impedance value refers to an impedance (e.g., resistance) value of the electronic switch 202 when in the ON state.

Furthermore, the control chip 201 may be preset to a predetermined protection current I. The predetermined protection current may be set according to actual situations. For example, when the maximum current output of a power supply module is 5 A, and the rated current of the connected power consuming apparatus 205 is 3 A, then the predetermined protection current may be set to 3 A. As another example, when the maximum current output of a power supply module is 5 A, and the rated current of the connected power consuming apparatus is 6 A, then the predetermined protection current may be set to 5 A. In certain embodiments, the setting of the predetermined protection current is based the maximum current output of a power supply module 204, as well as the rated current of the connected power consuming apparatus 205, and is not to be limited to the disclosed examples.

Furthermore, a voltage threshold U2 (V) can be determined through the current temperature, the current driving voltage, the electronic switch 202's impedance value R, and the predetermined protection current I; and this voltage threshold U2 is specifically expressed as: $U2 = I \times R$. This shows that the voltage threshold U2 is a value that changes in real time due to the impedance value R of the electronic switch 202 being variable.

For instance, at a first moment when the predetermined protection current I is 3 A, the temperature of the electronic switch 202 is 5 degrees, and the driving voltage is 4.5V, then the on-resistance of the electronic switch 202 is 4 milliohms.

Using U2=I×R, the determined voltage threshold U2 is 12 mV. At a second moment when the temperature of the electronic switch 202 is 20 degrees and the driving voltage is 4.5V, then the on-resistance of the electronic switch 202 is 4.6 milliohms. Again using U2=I×R, the determined voltage threshold U2 is 13.8 mV.

After the voltage threshold U2 is determined, the current turn-on voltage U1 of the electronic switch is obtained, the control chip 201 compares the turn-on voltage U1 with the voltage threshold U2. From the comparison, the control chip 201 is able to determine whether to switch-off the electronic switch 202, thereby providing the power supply module 204 with discharge overcurrent protection.

Because heat is generated during the operations of electronic switch and thereby causes the temperature of the electronic switch to rise, and also because the impedance value of the electronic switch changes with temperature, the control accuracy may not be precise when the electronic switch provides the power supply with a discharge overcurrent protection, unless the impact of temperature on the electronic switch is not taken into consideration. Accordingly, the protection method of the embodiments of the present application takes into account the impacts of temperature and driving voltage on the electronic switch 202. The control chip 201 obtains, in real time, the impedance value of the electronic switch 202 based on the driving voltage and temperature of the electronic switch 202. The control chip 201 sets the voltage based on the impedance value and the predetermined protection current value, so that it efficiently provides high control accuracy in protecting power supply from discharge overcurrent.

With reference to FIG. 1, in some embodiments the determining 106 whether to switch-off the electronic switch by comparing the turn-on voltage value with the voltage threshold may include: determining whether the turn-on voltage value is greater than the voltage threshold U2, controlling the electronic switch 202 to be in an OFF state in response to the turn-on voltage value exceeding the voltage threshold U2 (thereby stopping current flow from the power supply), and maintaining the electronic switch 202 in an ON state in response to the turn-on voltage value not exceeding the voltage threshold U2.

Furthermore, in order to timely inform the users of the state of the discharge overcurrent of the power module after comparing the turn-on voltage with the voltage threshold to determine the control of the switch-off of the electronic switch, the protection method 100 may further include: outputting a prompt to indicate that the power supply is in the state of discharge overcurrent in response to determining that the turn-on voltage is greater than the voltage threshold.

Referring again to FIG. 2, after the control chip 201 determines the voltage threshold U2 and obtains the current turn-on voltage U1 of the electronic switch 202, the control chip 201 determines whether the turn-on voltage U1 is greater than the voltage threshold U2. If the turn-on voltage U1 is greater than the voltage threshold U2, then the control chip 201 sends out an instruction to control the electronic switch 202 to be switched off (thus stopping current flow from the power supply module 204). Otherwise, if the turn-on voltage U1 is equal to or less than the voltage threshold U2, then the control chip 201 does not send any instruction to the electronic switch 202, and the electronic switch 202 maintains the ON state. While the electronic switch 202 is in the ON state, current flows from the power supply module 204 to the electrical terminal 206 to which a power consuming apparatus 205 connects.

In certain embodiments, in response to determining that the turn-on voltage of the electronic switch is greater than the voltage threshold (thus determining that the power supply is in the state of discharge overcurrent), the control chip 201 controls the electronic switch 202 to be switched off. While the electronic switch 202 is switched off (e.g., in the OFF state) no current flows from the power supply module 204 to the electrical terminal 206 to which the power consuming apparatus 205 connects. In the meantime, the control chip 201 may send out a prompt to user's terminal devices, such as cell phones, tablets, etc. indicating that the power supply apparatus 200 is in the state of discharge overcurrent due to the turn-on voltage exceeding the voltage threshold. The control chip 201 may include an output module that sends out the prompt.

In one embodiment, the control chip is equipped with a backup power supply and thereby can be powered up by the backup power supply when the electronic switch 202 switches off. Further, when the control chip 201 contains an output module, it can also output a prompt through the output module while powered by the backup power supply. The prompt can be either a voice message or a text message used for informing users that the power supply module is in the state of discharge overcurrent, and then users can identify the fault in a timely manner after being informed by the message.

In order to determine the impedance values of the electronic switch under different driving voltages and different temperatures, the controller has a pre-stored correspondence table, wherein the correspondence table correlates the temperature values, driving voltage values, and impedance values of the electronic switch 202. The impedance values indicate the on-resistance of the electronic switch 202 when it is turned on and driven with a $j^{th}$ driving voltage while at an $i^{th}$ temperature (e.g., of a battery cell forming the power supply module 204). The correspondence table may store on-resistance values for values of i from 1 to N and for values of j from 1 to M, wherein N is an integer greater than 0, and M is an integer greater than 0

In certain embodiments, the pre-stored correspondence table of the temperature values, driving voltage values, and impedance values of the electronic switch 202 may be provided by the manufacturer that produces the electronic products incorporated with the control chip 201 and electronic switch 202. In further embodiments, the manufacturer may store the correspondence table in the control chip 201. For example, when an electronic device leaves the factory, the supplier can have the correspondence table directly stored in the control chip 201. As another example, electronic device manufacturers can have the correspondence table of the temperature values, driving voltage values, and impedance values of electronic switches of electronic devices of different models stored in the cloud. Electronic devices may download the correspondence table from the cloud and then store it in the control chip 201.

The correspondence table of the temperature value, driving voltage value and impedance value of the electronic switch 202 may also be obtained through a test of the electronic switch 202. When testing the electronic switch 202 operating with different driving voltages, the corresponding temperature and impedance value of the electronic switch 202 under test are recorded and stored to develop a correspondence table of the temperature value, driving voltage value and impedance value of the electronic switch 202. An example of the corresponding table is shown in the following Table 1:

TABLE 1

| Driving Voltage (volt) | Temperature (Celsius degree) | Impedance (milliohm) |
|---|---|---|
| 2.5 | 0 | 6.2 |
| 2.5 | 20 | 7.3 |
| 2.5 | 40 | 8.2 |
| 3.1 | 0 | 4.8 |
| 3.1 | 20 | 5.7 |
| 3.1 | 40 | 6.5 |
| 3.7 | 0 | 4.0 |
| 3.7 | 20 | 5.1 |
| 3.7 | 40 | 6.4 |
| 4.0 | 0 | 3.9 |
| . | . | . |

When testing, it may use smaller test intervals to examine the driving voltages and temperatures, so as to achieve more accurate impedance values for the electronic switch 202 under different driving voltages and different temperatures. The test modes can be decided according to actual needs, and are not limited by the disclosed examples.

In some embodiments, the electronic switch 202 is a MOS (metal-oxide semiconductor) transistor switch. In such embodiments, the MOS transistor switch is encapsulated inside the control chip 201. As the space constraint on electronic devices becomes more stringent, battery space in electronic devices is also strictly limited. In the disclosed embodiments, the control chip 201 used for providing power supply with a discharge overcurrent protection and the MOS transistor switch (e.g., the electronic switch 202) may be encapsulated together, so that it saves space and benefits the compact design of electronic devices.

Embodiment 2

With further reference to FIG. 2, a second embodiment is disclosed based on the same concept and corresponding to the methods of the first embodiment 1. The second embodiment further provides a circuit protection device 203 used for a power supply module 204, and the circuit protection device 202 comprises a control chip 201 and an electronic switch 202. As depicted, the power supply module 204 may be external to the circuit protection device 203, wherein the circuit protection device 203 is located between the power supply module 204 and the load (e.g., at least one power consuming apparatus 205).

The control chip 201 includes a power supply input and a power supply output, and the power supply input is connected with a positive electrode of the power supply module 204. One end of the electronic switch 202 is connected with the power supply output of the control chip for receiving the driving voltage provided by the control chip, and the other end of the electronic switch is connected in series with a negative electrode of the power supply module.

When the power supply module 204, the control chip 201, and the electronic switch 202 form a closed loop with at least one power consuming apparatus, the control chip 201, with the electronic switch 202 being turned on, performs the following steps in a reciprocating manner: 1) monitoring, in real time, a turn-on voltage value across the electronic switch 202 and a temperature value of the electronic switch 202; 2) monitoring, in real time, a driving voltage value of the electronic switch 202 at the temperature value; 3) determining an impedance value of the electronic switch 202 based on the temperature value and the driving voltage value, wherein the impedance value changes with the temperature; 4) determining a voltage threshold based on the impedance value and a predetermined protection current, wherein the voltage threshold changes with the impedance value; and 5) controlling a state of the electronic switch based on a comparison of the turn-on voltage value with the voltage threshold, whereby providing the power supply module 204 with discharge overcurrent protection.

In certain embodiments, the control chip 201 is further configured to determine whether the turn-on voltage value is greater than the voltage threshold and, if yes, control the electronic switch to be in an OFF state. Otherwise, the control chip 201 maintains the electronic switch in an ON state. In some embodiments, the electronic switch 202 may be a MOS transistor switch. In further embodiments, the electronic switch 202 may be encapsulated inside the control chip 201.

In certain embodiments, the control chip 201 may pre-store a correspondence table of the temperature value of the electronic switch 202, the driving voltage value of the electronic switch 202, and the impedance value of the electric switch 202. The correspondence table may describe the on-resistance of the MOS transistor switch when driven with a $j^{th}$ driving voltage and while at an $i^{th}$ temperature, for a sequence where i is from 1 to N and j is from 1 to M; wherein, N is an integer greater than 0, and M is an integer greater than 0.

Embodiment 3

Figure 3:
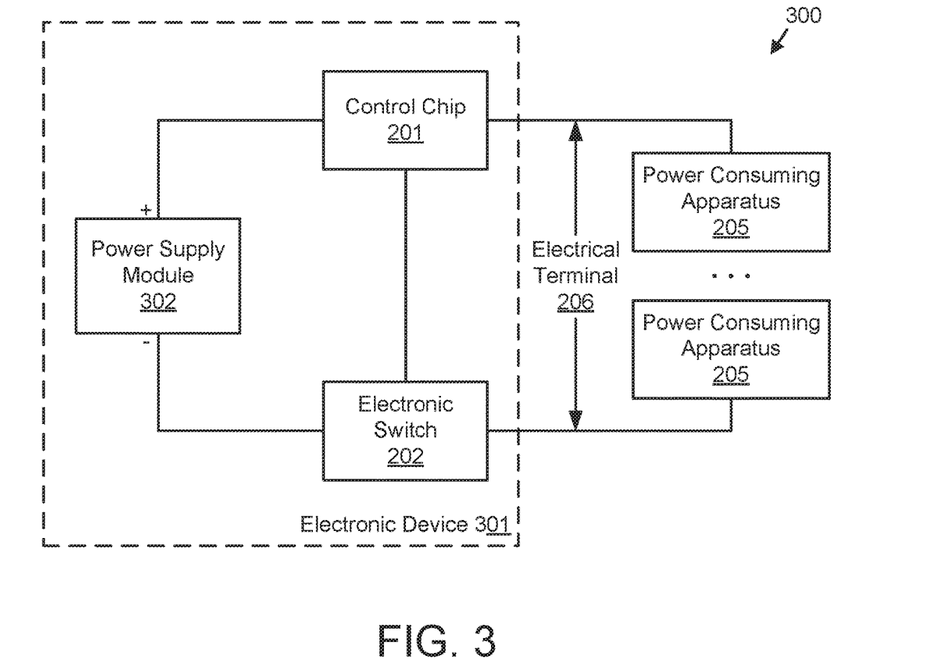
FIG. 3 is a structural diagram illustrating one embodiment of a system for preventing overcurrent discharge.

A third embodiment is disclosed with reference to FIG. 3. The third embodiment is based on the same concept and corresponding methods of the first embodiment. FIG. 3 depicts a system 300 for preventing overcurrent discharge. According to the third embodiment, the system 300 includes an electronic device 301, which comprises: a power supply module 302, a control chip 201, and an electronic switch 202. The electronic device 301 may be one embodiment of a power supply apparatus. As depicted, the power module 302 may be internal to the electronic device 301.

The control chip 201 has a power supply input and a power supply output, with the power supply input being connected with a positive electrode of the power supply module 302. One end of the electronic switch 202 is connected with the power supply output of the control chip 201 and receives a driving voltage provided by the control chip 201. The other end of the electronic switch 202 is connected in series with a negative electrode of the power supply module 302.

When the power module 302, the control chip 201, and the electronic switch 202 form a closed loop with at least one power consuming apparatus 205 (connected to an electrical terminal 206), then the control chip 201, with the electronic switch being turned on, performs the following steps in a reciprocating manner: 1) monitoring, in real time, a turn-on voltage value across the electronic switch 202 and a temperature value of the electronic switch 202; 2) monitoring, in real time, a driving voltage value of the electronic switch 202 at the temperature value; 3) determining an impedance value of the electronic switch 202 based on the temperature value and the driving voltage value, wherein the impedance value changes with the temperature; 4) determining a voltage threshold based on the impedance value and a predetermined protection current, wherein the voltage threshold changes with the impedance value; and 5) controlling a state of the electronic switch based on a comparison of the turn-on voltage value with the voltage threshold, whereby providing the electronic device 301 with discharge overcurrent protection.

In certain embodiments, the control chip 201 is further configured to determine whether the turn-on voltage value is greater than the voltage threshold and, if yes, control the electronic switch to be in an OFF state. Otherwise, the control chip 201 maintains the electronic switch in an ON state. In some embodiments, the electronic switch 202 may be a MOS transistor switch. In further embodiments, the electronic switch 202 may be encapsulated inside the control chip 201.

In certain embodiments, the control chip 201 may pre-store a correspondence table of the temperature value of the electronic switch 202, the driving voltage value of the electronic switch 202, and the impedance value of the electric switch 202. The correspondence table may contain on-resistance impedance values of the protection circuit when driven with a $j^{th}$ driving voltage at an $i^{th}$ temperature for values of i from 1 to N and for values of j from 1 to M, wherein N is an integer greater than 0, and M is an integer greater than 0.

Figure 4:
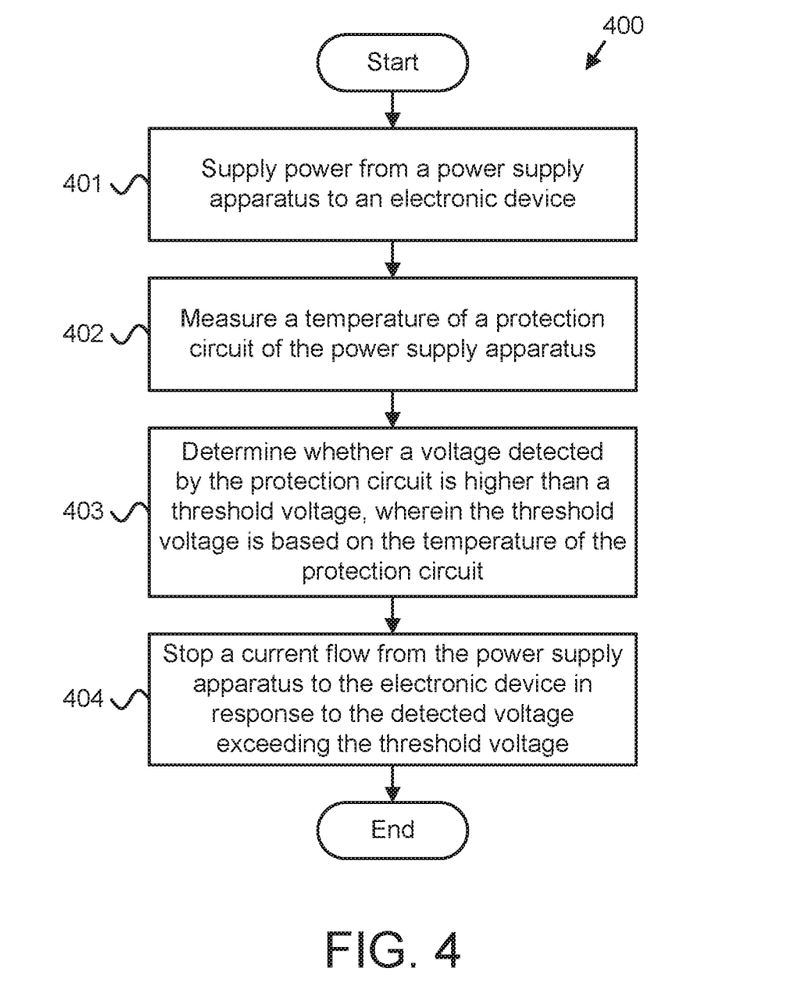
FIG. 4 is a flow diagram illustrating another embodiment of a protection method.

FIG. 4 is a flow chart diagram depicting a method 400 for preventing overcurrent discharge. The method 400 may be applied to a circuit protection device that provides a power supply with a discharge overcurrent protection. The method 400 may be performed in a reciprocating manner when an electronic switch is turned on. In one embodiment, the method 400 is performed by the power supply apparatus. In another embodiment, the method 400 may be performed by the electronic device. Alternatively, the method 400 may be performed by a processor and a computer readable storage medium. The computer readable storage medium may store code that is executed on the processor to perform the functions of the method 400.

The method 400 begins and supplies 401 power from a power supply apparatus to an electronic device. In one embodiment, the power supply module 204 and/or the power supply module 301 may supply 401 power to the electronic device. In certain embodiments, the electronic device is a power consuming apparatus 205, as discussed above.

The method 400 measures 402 a temperature of a protection circuit of the power supply apparatus. In one embodiment, the control chip 201 measures 402 the temperature of the protection circuit. In another embodiment, the control chip 201 receives the temperature from a temperature sensor connected to or embedded in the control chip 201. In some embodiments, the protection circuit includes a control chip 201. In certain embodiments, the measured temperature is a temperature of an electronic switch 203. In other embodiments, the temperature of the electronic switch 203 may be estimated by measuring a temperature of a battery (or battery cell) to which the protection circuit is attached.

The method 400 determines 403 whether the voltage detected by the protection circuit is higher than a threshold voltage, wherein the threshold voltage is based on the temperature of the protection circuit. In one embodiment, a control chip 201 in the protection circuit detects the voltage. In a further embodiment, the control chip 201 determines 403 whether the detected voltage exceeds the threshold voltage. Determining 403 whether the voltage detected by the protection circuit is higher than the threshold voltage may include, in real time, detecting the voltage and comparing the detected voltage to the threshold voltage.

In some embodiments, the threshold voltage is calculated using an impedance value of an electronic switch 203 in the protection circuit and a predetermined protection current. The impedance value of the electronic switch may be based on the temperature of the protection circuit and a driving voltage value provided by the control chip 201 to the electronic switch 203. In some embodiments, determining 403 whether the voltage detected by the protection circuit is higher than the threshold voltage includes monitoring, in real time, the driving voltage and the temperature and updating the threshold voltage based on the real-time driving voltage and temperature values.

The method 400 stops 404 a current flow from the power supply apparatus to the electronic device in response to the detected voltage exceeding the threshold voltage. In one embodiment, the control chip 201 stops 404 the current flow from the power supply apparatus to the electronic device. In some embodiments, stopping 404 the current flow includes the control chip 201 controlling a driving voltage provided to the electronic switch 202, so as to place the electronic switch 203 in an off state. The method 400 ends.

Figure 5:
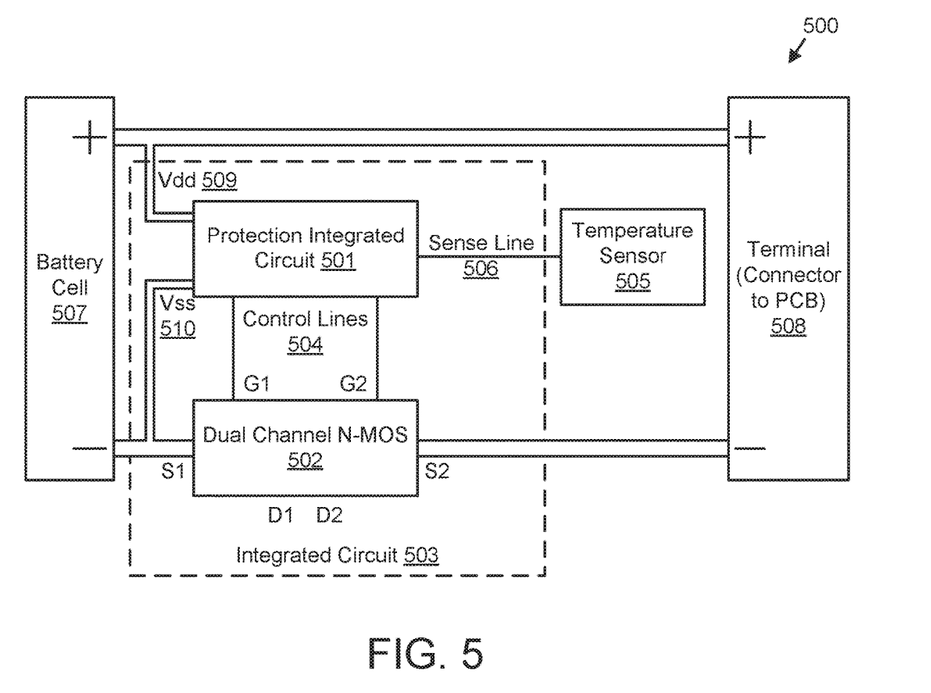
FIG. 5 is a schematic diagram illustrating one embodiment of a protection device.

FIG. 5 is a schematic diagram depicting a protection device 500, according to embodiments of the disclosure. The protection device 500 includes a protection integrated circuit 501 and a dual channel N-MOS transistor switch 502. In the depicted embodiment, the protection integrated circuit 501 and the dual channel N-MOS transistor switch 502 are implemented in the same integrated circuit 503. The protection greater circuit 501 controls the dual channel N-MOS transistor switch 502 using a pair of the control lines 504. As depicted, a first control line 504 drives voltage at a first gate of the dual channel N-MOS transistor switch 502 and a second control line 504 drives voltage at a second gate of the dual channel N-MOS transistor switch 502.

The protection integrated circuit 501 is communicatively coupled to a temperature sensor 505 that measures a temperature of the protection device 500. In certain embodiments, the temperature sensor 505 is located in sufficient proximity to the integrated circuit 503 so the temperature is measured by the temperature sensor 504 accurately represent temperatures of the integrated circuit 503. In the depicted embodiment, the temperature sensor 505 is external to the integrated circuit 503 and the protection integrated circuit 501 receives temperature data from the temperature sensor 504 over a sense line 506.

In certain embodiments, the protection integrated circuit 501 prevents overcurrent discharge by monitoring, in real time, a turn-on voltage value across the dual channel N-MOS transistor switch 502 (e.g., the voltage from the terminal side to the battery cell side of the dual channel N-MOS transistor switch 502), a temperature value measured by the temperature sensor 505, and a driving voltage value of the dual channel N-MOS transistor switch 502 (e.g., a gate-to-source voltage) at the temperature value. The protection integrated circuit 501 may determine an impedance value of the dual channel N-MOS transistor switch 502 based on the temperature value and the driving voltage value, wherein the impedance value changes with the temperature.

The protection integrated circuit 501 may further determine a voltage threshold U2 based on the impedance value and a predetermined protection current, wherein the voltage threshold changes with the impedance value. The protection integrated circuit 501 may control the dual channel N-MOS transistor switch 502 (e.g., by applying a driving voltage at the control lines 504) to permit current flow from the battery cell 507 to the terminal 508 while the turn-on voltage value is less than or equal to the voltage threshold U2. Further, the protection integrated circuit 501 may stop the current flow from the battery 507 to the terminal 508 in response to the turn-on voltage being higher than the threshold voltage U2.

The integrated circuit 503 is interposed between a battery cell 507 and a terminal 508. In one embodiment, the terminal 508 is a connector to a printed circuit board ("PCB"). Specifically, the dual channel NMOS transistor switch 502 may be located at a ground line connecting the negative electrode of the battery cell 507 to the terminal 508. As depicted, the protection integrated circuit 501 may be connected to the positive electrode of the battery cell 507 and receive a positive power supply voltage (label "Vdd") 509 from said connection. Additionally, the protection integrated circuit 501 may be connected to the negative electrode of the battery cell 507, receiving a negative (ground) power supply voltage (labeled "Vss") 510 from said connection.

The aforementioned embodiments of the present application prevent overcurrent discharge by performing the following steps in a reciprocating manner when the electronic switch is turned on: 1) monitoring, in real time, a turn-on voltage value across the electronic switch and a temperature value of the electronic switch; 2) monitoring, in real time, a driving voltage value of the electronic switch at the temperature value; 3) determining an impedance value of the electronic switch based on the temperature value and the driving voltage value, wherein the impedance value changes with the temperature; 4) determining a voltage threshold based on the impedance value and a predetermined protection current, wherein the voltage threshold changes with the impedance value; and 5) controlling a state of the electronic switch based on a comparison of the turn-on voltage value with the voltage threshold, whereby providing a power supply with a discharge overcurrent protection.

Additionally, the aforementioned embodiments improve control accuracy by taking full account of the impacts of temperature and driving voltage on the electronic switch. Because the heat generated during operation of an electronic switch would cause the temperature of the electronic switch to rise and also because the impedance value of the electronic switch changes with the temperature, the control accuracy may not be precise when the discharge overcurrent protection of the power supply is carried out through the electronic switch unless the impact of temperature on the electronic switch is not taken into consideration. Accordingly, the protection method obtains the impedance value of the electronic switch in real time based on the driving voltage and temperature of the electronic switch and sets the threshold voltage based on the impedance value and a preset protection current value, thereby improving the control accuracy for the discharge overcurrent protection of a power supply.

A circuit protection device according to the aforementioned embodiments may include a control chip with a MOS transistor switch is encapsulated inside the control chip. By encapsulating the control chip used for the discharge overcurrent protection of power supply and the MOS transistor switch together, space may be save to benefit the compact design of electronic devices.

Those skilled in the art should understand that the embodiments of the present disclosure can be provided as a method, a system, or a computer program product. The present disclosure, therefore, may adopt the forms of full hardware embodiment, full software embodiment, or the embodiment of combining software and hardware. Furthermore, the present disclosure can adopt the form of a computer program product, which can be implemented on one or multiple computer-usable storage media (including, but not limited to, disk storage, CD-ROM, optical storage, etc.) that contain computer-usable program codes.

The present disclosure is described in reference to the flow diagrams and/or block diagrams of the method, equipment (system) and computer program product of the embodiments of the present disclosure. It should be understood that each procedure and/or block in the flow diagrams and/or the block diagrams, as well as the combination of the procedures and/or blocks in the flow diagrams and/or the block diagrams may be implemented by computer programmed instructions. These computer program instructions may be provided to a general purpose computer, special purpose computer, embedded processor or other processors of other programmable data processing apparatus to produce a machine, so that the instructions executed by the processor of a computer or other programmable data processing apparatus generate a device that can achieve the functions specified in one or multiple procedures of the flow diagrams and/or one or multiple blocks of the block diagrams.

These computer program instructions can also be stored in a computer readable memory that directs a computer or other programmable data processing apparatus to operate in a particular manner, so that the instructions stored in the computer readable memory produce a manufactured product that contains instructional means, and such instructional means achieves the functions specified in one or multiple procedures of the flow diagrams and/or in one or multiple blocks of the block diagrams.

These computer program instructions can also be uploaded onto a computer or other programmable data processing apparatus, so that the computer or other programmable apparatus perform a series of operation steps to generate the processes implemented by a computer, thus the instructions executed on a computer or other programmable apparatus can provide the steps for achieving the functions specified in one or multiple procedures of the flow diagrams and/or one or multiple blocks of the block diagrams.

Specifically, the computer program instructions that correspond to the protection method of the embodiments of the present application can be stored in storage media, such as CD-ROM, hard disk, USB disk, etc.; when the computer program instructions that correspond to the protection method are read or executed by an electronic device from the storage media, the following steps may be performed in a reciprocating manner when an electronic switch is turned on: 1) monitoring, in real time, a turn-on voltage value across the electronic switch and a temperature value of the electronic switch; 2) monitoring, in real time, a driving voltage value of the electronic switch at the temperature value; 3) determining an impedance value of the electronic switch based on the temperature value and the driving voltage value, wherein the impedance value changes with the temperature; 4) determining a voltage threshold based on the impedance value and a predetermined protection current, wherein the voltage threshold changes with the impedance value; and 5) controlling a state of the electronic switch based on a comparison of the turn-on voltage value with the voltage threshold, whereby providing a power supply with a discharge overcurrent protection.

In certain embodiments, controlling a state of the electronic switch based on a comparison of the turn-on voltage value with the voltage threshold includes determining whether the turn-on voltage value is greater than the voltage threshold. If yes, the computer program instructions control the electronic switch to be in an OFF state. Otherwise, the computer program instructions maintain the electronic switch in an ON state. In some embodiments, the electronic switch may be a MOS transistor switch. In further embodiments, the electronic switch may be encapsulated inside a control chip.

In certain embodiments, the computer program instructions control chip may further include pre-storing a correspondence table of the temperature value of the electronic switch, the driving voltage value of the electronic switch, and the impedance value of the electric switch. The correspondence table may describe, for a sequence where i is from 1 to N and j is from 1 to M; wherein, N is an integer greater than 0, and M is an integer greater than 0, the on-resistance of the MOS transistor switch when driven with a $j^{th}$ driving voltage and while at an $i^{th}$ temperature.

Optionally, there are some other computer program instructions stored in the storage media, and these some other computer program instructions are executed after the computer program instructions corresponding to the steps of determining the control of the switch-off of the electronic switch are executed by comparing the turn-on voltage value with the voltage threshold, and the execution process comprises outputting a prompt to indicate that the power supply is in the state of discharge overcurrent when determine that the turn-on voltage is greater than the voltage threshold.

With the descriptions of the preferred embodiments of the present disclosure, those skilled in the art may make further changes and modifications to these embodiments once they understand the basic inventive concepts. Therefore, the appended claims are intended to cover the preferred embodiments as well as all the changes and modifications that fall within the scope of the present disclosure.

It is apparent that those skilled in the art may make various changes and modifications to the present disclosure without departing from the spirit and scope of the present disclosure. Therefore, if these modifications and variations fall within the scope of the claims as well as the equivalents thereof, the present disclosure intends to include these modifications and variations, as well.

What is claimed is:

1. A power supply apparatus, comprising:
a power supply module;
a backup power supply that is separate from the power supply module;
a protection circuit coupled to the power supply module and an electrical terminal, the protection circuit comprising:
  a controller that directs power from the power supply module to the electrical terminal, and
  an electronic switch coupled to the controller; and
a temperature sensor that measures a temperature of the protection circuit,
wherein the controller measures a temperature value of the protection circuit and determines an impedance value of the electronic switch based on a temperature of the protection circuit, the impedance value varying with temperature,
wherein the controller calculates a threshold voltage based on the impedance value and a protection current threshold,
wherein the controller operatively controls the electronic switch to stop a current flow from the power supply module to the electrical terminal in response to a voltage drop across the electronic switch being higher than the threshold voltage, and
wherein the backup power supply powers the controller in response to stopping current flow from the power supply module.

2. The power supply apparatus of claim 1, wherein the electronic switch is a MOS transistor switch.

3. The power supply apparatus of claim 2, wherein the MOS transistor switch is encapsulated inside the controller.

4. The power supply apparatus of claim 1, wherein the controller provides a driving voltage that maintains the electronic switch in an on state in response to the voltage detected by the controller not being higher than the voltage threshold.

5. The power supply apparatus of claim 1, wherein the controller stores a correspondence table, the correspondence table correlating temperature values of the electronic switch, driving voltage values of the electronic switch, and impedance values of the electric switch, wherein the correspondence table contains an on-resistance impedance value of the protection circuit when driven with a $j^{th}$ driving voltage at an $i^{th}$ temperature for values of i from 1 to N and for values of j from 1 to M, wherein N is an integer greater than 0, and M is an integer greater than 0.

6. The power supply apparatus of claim 1, wherein the controller comprises an output module that outputs a prompt to indicate that the power supply apparatus is in a discharge overcurrent in response to the detected voltage exceeding the threshold voltage.

7. The power supply apparatus of claim 6, wherein the output module sends the prompt to a user terminal device.

8. The power supply apparatus of claim 1, wherein the electrical terminal is connectable with an electronic device to provide power thereto.

9. A method of providing power to an electronic device, the method comprising:
supplying power from a power supply apparatus to the electronic device;
measuring a temperature of a protection circuit of the power supply apparatus, the protection circuit comprising an electronic switch;
determining an impedance value of the electronic switch based on a temperature of the protection circuit, wherein the impedance value changes with temperature;
calculating a threshold voltage based on the impedance value and a protection current threshold, wherein the threshold voltage changes with the impedance value;
detecting a voltage drop across the electronic switch;
determining if the voltage drop across the electronic switch is higher than the threshold voltage;
stopping a current flow from the power supply apparatus to the electronic device in response to the detected voltage exceeding the threshold voltage; and
supplying power to the protection circuit from a backup power supply separate from the power supply apparatus in response to stopping current flow from the power supply apparatus.

10. The method of claim 9, wherein the protection circuit comprises a control chip and the electronic switch comprises a MOS transistor switch encapsulated inside the control chip, wherein stopping a current flow from the power supply apparatus comprises setting the MOS transistor switch to an off state.

11. The method of claim 10, further comprising maintaining the MOS transistor switch in an on state in response to the detected voltage drop not exceeding the voltage threshold.

12. The method of claim 9, further comprising:
pre-storing a correspondence table of the temperature values of the protection circuit, driving voltage values of the protection circuit, and the impedance values of the protection circuit;
wherein the correspondence table contains an on-resistance impedance value of the protection circuit when driven with a $j^{th}$ driving voltage at an $i^{th}$ temperature for values of i from 1 to N and for values of j from 1 to M, wherein N is an integer greater than 0, and M is an integer greater than 0.

13. The method of claim 9, further comprising:

outputting a prompt to indicate that the power supply apparatus is in a discharge overcurrent in response to the detected voltage drop exceeding the threshold voltage.

14. An electronic device, comprising:

a power supply module;

a backup power supply separate from the power supply module;

a control chip connected to the power supply module; and an electronic switch controllable by the control chip, wherein the control chip:

monitors, in real time, a turn-on voltage value across the electronic switch and a temperature value of the electronic switch;

monitors, in real time, a driving voltage value of the electronic switch at the temperature value;

determines an impedance value of the electronic switch based on the temperature value and the driving voltage value, wherein the impedance value changes with temperature;

determines a voltage threshold based on the impedance value and a predetermined protection current, wherein the voltage threshold changes with the impedance value; and, controls a state of the electronic switch based on a comparison of the turn-on voltage value to the voltage threshold, wherein the controller controls the electronic switch to stop current flow from the power supply module in response to the turn-on voltage value exceeding the voltage threshold, wherein the backup power supply powers the controller in response to stopping current flow from the power supply module.

15. The electronic device of claim 14, wherein the control chip comprising a power supply input and a power supply output, the power supply input being connected with a positive electrode of the power supply module.

16. The electronic device of claim 15, wherein one end of the electronic switch is connected with the power supply output of the control chip, wherein the control chip provides the electronic switch with the driving voltage over the power supply output, and wherein the other end of the electronic switch is connected in series with a negative electrode of the power supply module.

17. The electronic device of claim 14, wherein the electronic switch is a MOS transistor switch.

18. The electronic device of claim 17, wherein the MOS transistor switch is encapsulated inside the control chip.

19. The electronic device of claim 14, wherein the protection current threshold is selected based on a lower of a maximum output current of the power supply module and the rated current of the electronic device.

* * * * *